UNITED STATES PATENT OFFICE.

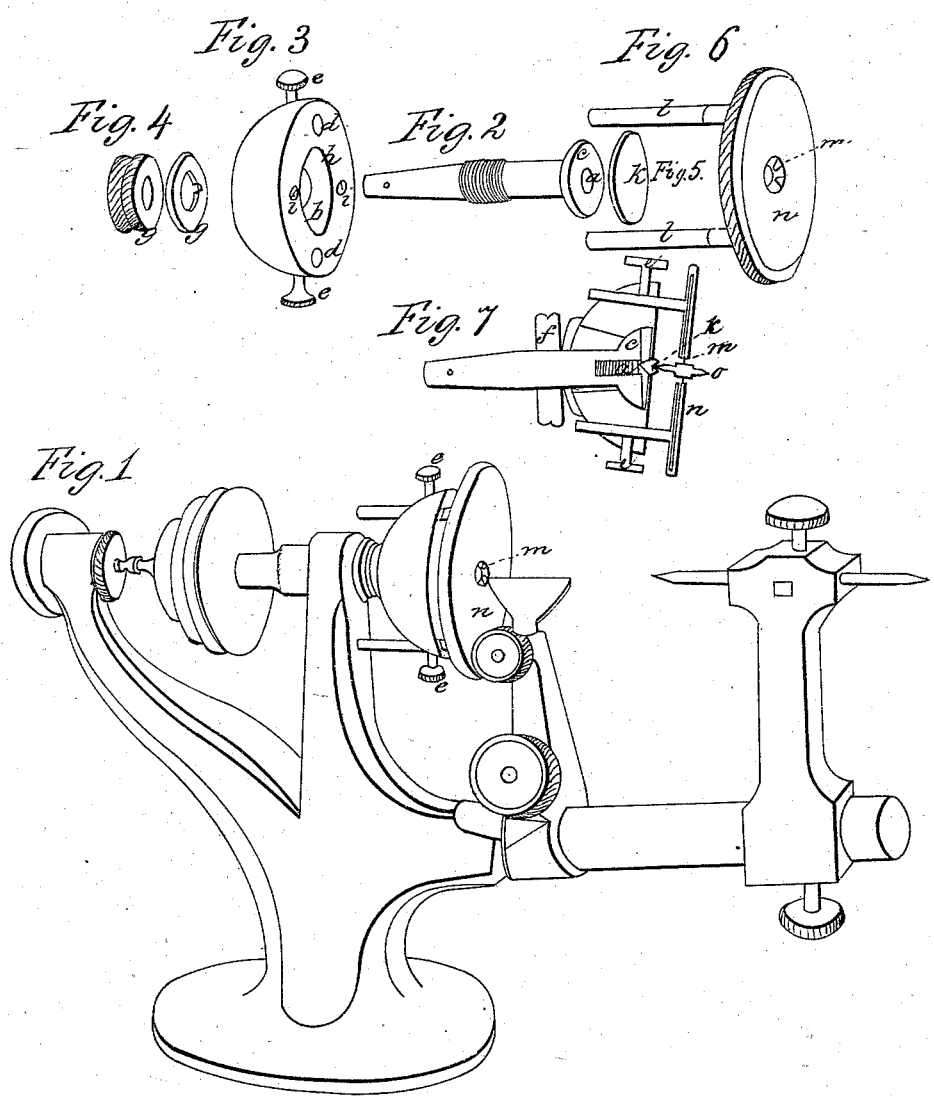

GAML. JACKSON, OF CINCINNATI, OHIO.

IMPROVED WATCHMAKER'S LATHE.

Specification forming part of Letters Patent No. 36,842, dated November 4, 1862.

*To all whom it may concern:*

Be it known that I, GAML. JACKSON, of Cincinnati, in the county of Hamilton and State of Ohio, have invented new and useful Improvements in Watchmakers' Lathes, by which cylinders, staffs, pinions, and other pieces of watch-work may be grasped at any part of the piece, and afterward adjusted to run true while being turned; and I do hereby declare that the following is a full and exact description of the construction and operation of the same, reference being had to the annexed drawings, making a part of this specification, in which—

Figure 1 is a perspective view of an ordinary watchmaker's-lathe with my "face-plate" or chucking aparatus attached; Figs. 2, 3, 4, 5, 6, its several detached parts, and Fig. 7 a vertical section.

The first part of my invention relates to fastening the piece to be turned in the lathe; and it consists in arranging the grasping apparatus to slide on the spindle by means of rods parallel to it, and to which the grasping part is permanently fixed in such a manner that the piece may be grasped at any part of it. When it is thus secured, one of its ends will project through the grasping apparatus, the other resting in the stationary head-center.

The second part of my invention relates to adjusting work to run truly after it is secured in the lathe; and it consists in arranging the chuck containing the article to be turned to move on the end of the spindle by means of a ball-and-socket joint, in such a manner that the center of the socket will be the head-center of the lathe, in which one end of the piece to be turned will rest while the other is being adjusted on a line with the spindle. This method of adjusting work differs from others heretofore used in the respect that one end of the piece remains stationary while the other end is being adjusted.

To enable those skilled in the art to fully understand my invention, I will proceed to describe it with reference to the drawings.

Fig. 1 is a perspective view of my lathe with all its parts in place. Fig. 2 is a straight cylindrical chuck, one end of which is tapered, and is received in a socket in the spindle of the lathe. The other end terminates in a hemispherical head, the diameter of which is double that of the body of the chuck. A portion about the middle of the chuck is sufficiently enlarged to afford a screw, to which the tightening-nut in Fig. 4 is adapted, and in the enlarged end of it is a spring-center, $a$, the use of which will be explained.

Fig. 3 is a hollow hemisphere, the inner surface of which, $b$, corresponds with the head $c$, Fig. 2, on which it plays. It has also three parallel holes through it at right angles to its plane surface—one through its center continuous with the opening $b$ and large enough to allow the piece to play freely on the head $c$. The others are smaller, and open opposite each other about the middle of the rim of the piece. (Shown at $d\ d$.) The tightening-screws $e\ e$ reach the holes $d\ d$. The tightening-nut and washer $f\ g$, Fig. 4, tighten on the head, Fig. 3, holding it firmly against the spindle head $c$, Fig. 2.

Fig. 5 is a thin circular plate adapted to the recess $h$, Fig. 3, and secured by screws $i\ i$. The center of this plate $k$ is arranged to be the center of motion of the ball-and-socket joint thus formed, and is consequently not affected by the motions of the joint.

Fig. 6 is a circular plate, in which jaws are arranged to move from the direction of its periphery to its center. Parallel rods $l\ l$ are fastened to this plate and correspond with the holes $d\ d$, Fig. 3, through which they slide, and are secured by thumb-screws $e\ e$.

Fig. 7 is a vertical section, and represents a piece of work secured, but not adjusted.

To operate this lathe, the nut $f$ is first tightened to hold the head steady while the work is being secured. The grasping-jaws $m$ are opened sufficiently to allow the piece to be turned to pass between them, one end of the piece $o$ being now placed in the center $k$, the other end projecting through the jaw-plate $n$. This plate is to be moved so that the jaws will grasp the piece at any desired part and then secured by the screws $e\ e$. The jaws being now brought together on the piece, it will be secured ready for adjusting, as seen in Fig. 7.

To adjust the piece, the tightening-nut $f$ is turned back, allowing the head containing the work to move freely on the spindle-head $c$, being held lightly against it by the spring-center $a$. The spindle of the lathe being started to revolve, and a smooth-pointed rod being held against the free end of the work, it will be brought on a line with the spindle. A turn of the nut $f$ will secure it, ready for turning.

What I claim as my invention, and desire to secure by Letters Patent, is—

1. The arrangement of grasping apparatus on parallel adjustable rods $l\,l$ in such a manner that the piece to be turned may be grasped at any part, one end of it resting in a stationary center.

2. The application of ball-and-socket motion to the head of a lathe in such a manner that one end of a piece of work may be adjusted while the other end rests in a stationary center, constructed and operating as herein set forth.

GAML. JACKSON.

Witnesses:
JAMES LESLIE,
J. W. WOODLEY.